United States Patent [19]
Yukuta et al.

[11] 3,940,369
[45] Feb. 24, 1976

[54] METHOD FOR PREPARING POLYURETHANES USING 3,9-BIS(2-HYDRAZIDOETHYL)-2-4,8,10-TETRAOXASPIRO-[5,5]-UNDECANE AS CHAIN EXTENDER

[75] Inventors: Toshio Yukuta, Tokyo; Takashi Ohashi, Iruma, both of Japan

[73] Assignee: Bridgestone Tire Company Limited, Tokyo, Japan

[22] Filed: Nov. 25, 1974

[21] Appl. No.: 527,080

[30] Foreign Application Priority Data
Nov. 28, 1973 Japan............................... 48-132549

[52] U.S. Cl. 260/75 NH; 260/77.5 AM; 260/77.5 CH; 260/340.7

[51] Int. Cl.$^2$................. C08G 18/32; C07D 319/04
[58] Field of Search .... 260/75 NH, 77.5 AM, 340.7

[56] References Cited
UNITED STATES PATENTS

| 3,475,377 | 10/1969 | Rosendahl et al. ............ 260/75 NH |
| 3,609,169 | 9/1971 | Iifima et al...................... 260/340.7 |

*Primary Examiner*—H. S. Cockeram
*Attorney, Agent, or Firm*—Brooks Haidt Haffner & Delahunty

[57] ABSTRACT

Polyurethane is prepared by reacting a prepolymer having terminal isocyanate groups with 3,9-bis(2-hydrazidoethyl)-2,4,8,10-tetraoxaspiro-[5,5]-undecane.

9 Claims, No Drawings

METHOD FOR PREPARING POLYURETHANES USING 3,9-BIS(2-HYDRAZIDOETHYL)-2-4,8,10-TETRAOXASPIRO-[5,5]-UNDECANE AS CHAIN EXTENDER

BACKGROUND OF THE INVENTION

1. Field of the Invention

The present invention relates to a method for preparing polyurethane, and more particularly to a method for preparing polyurethane having excellent resistance to thermal aging, weather proofing and non-discoloring properties comprising using 3,9-bis(2-hydrazidoethyl)-2,4,8,10-tetraoxaspiro-[5,5]-undecane as a chain extender.

2. Description of the Prior Art

Polyurethane is usually prepared by reacting a prepolymer having terminal isocyanate groups with a chain extender such as diamines. However, the use of diamines such as methylene-bis-ortho chloroaniline has recently been strictly restricted owing to their poisonous property. Therefore, the demand for a novel chain extender having non-poisonous property is increasing. On the other hand, the reactivity of diamine with an isocyanate compound is generally so high that the pot life can not be advantageously controlled and the gelatinization often occurs and the discolored polymer is formed under some reaction condition.

To overcome the defect described above, aliphatic or alicyclic diisocyanate have been often used instead of aromatic diisocyanate. However, the reactivity of the aliphatic or alicyclic diisocyanate is inferior to that of aromatic diisocyanate so that a high reaction temperature or a large amount of the chain extender are required. Moreover, the physical properties, particularly hardness of the resulting polymers are also unsatisfactory.

The present inventors have found 3,9-bis(2-hydrazidoethyl)-2,4,8,10-tetraoxaspiro-[5,5]-undecane to be a novel chain extender, giving a polyurethane of excellent properties.

SUMMARY OF THE INVENTION

According to the present invention, there is provided a method for preparing polyurethane which comprises reacting 3,9-bis(2-hydrazidoethyl)-2,4,8,10-tetraoxaspiro-[5,5]-undecane as a chain extender with a prepolymer having terminal isocyanate groups produced by reacting an organic polyisocyanate with a hydroxyl-containing compound having a number average molecular weight ranging from 400 to 5000.

An object of the present invention is to provide a method for preparing polyurethane having excellent resistance to thermal aging, weather proofing and non-discoloring properties and toughness.

Another object of the present invention is to provide a method for preparing polyurethane which is superior in transparency and physical properties.

A further object of the present invention is to provide a method for preparing polyurethane of which pot life is satisfactorily long.

Still another object of the present invention is to provide a chain extender which can be easily handled.

DESCRIPTION OF THE PREFERRED EMBODIMENTS

A prepolymer to be used in the present invention may be prepared by reacting an excess of an organic polyisocyanate with a hydroxyl-containing compound of 400 – 5000 of a number average molecular weight such as, for example, from the class of polyether polyols, polyester polyols and hydrocarbon polyols.

Representative polyether polyol is a polyether having terminal hydroxyl groups, for example, polyalkylene oxides such as polyethylene oxide, polypropylene oxide, polybutylene oxide, polyamylene oxide, and analogues thereof, polyepihalohydrins such as polyepichlorohydrin, polyaralkylene oxides such as polystyrene oxide, and analogues thereof, polyhydroxylic polyalkylene ethers such as polytetramethylene glycol, copolymers of said oxides and tetrahydrofuran and polyacetals prepared by condensation of butenedioxyethyl glycol or diethylene glycol with formaldehyde. The preferred polyether polyols are polytetramethylene glycol and polypropylene glycol.

The polyester polyol is a polyester having terminal hydroxyl groups, for example, hydroxyesters prepared by reacting polybasic carboxylic acids such as oxalic acid, malonic acid, succinic acid, glutaric acid, adipic acid, pimelic acid, cork acid, azelaic acid, sebacic acid, brassylic acid, fumaric acid, glutaconic acid, $\alpha$-hydromuconic acid, $\beta$-hydromuconic acid, $\alpha$-butyl$\alpha$-ethyl-glutaric acid, $\alpha,\beta$-diethyl succinic acid, phthalic acid, isophthalic acid, terephthalic acid, trimellitic acid, trimesic acid, mellophonic acid, prehnitylic acid, pyromellitic acid, benzene-pentacarboxylic acid, 1,4-cyclohexanedicarboxylic acid, 1,3,5-benzene tricarboxylic acid, 3,4,9,10-perylene tetracarboxylic acid or analogues thereof with polyols such as ethylene glycol, propylene glycol, propane-1,2-diol, propane-1,3-diol, allyloxpropane diol, butane-1,4-diol, butane-1,3-diol, butane-2,3-diol, butane-2,4-diol, butane-dioxyethyl glycol, butene-1,4-diol, pentane-1,4-diol, pentane-1,5-diol, hexane-1,6-diol, decane-1,10-diol, dodecane-1,12-diol, octadecane-7,18-diol, 4,4'-dihydroxydicyclohexylmethane, 4,4'-dihydroxydicyclohexyldimethylmethane, bis-2-hydroxyethylterephthalate, xylylene glycol, glycerine, castor oil, trimethylol propane, trimethylol ethane, hexane-1,2,6-triol, hexane-1,3,6-triol, saccharoid such as pentaerythritol, sorbitol or mannitol, hydroquinone, 4,4'-dihydroxydiphenylmethane, 4,4'-dihydroxydiphenyldimethylmethane, resorcinol thiodiglycol, glycol and analogues thereof and mixtures thereof, and is preferably dihydroxypolyethylene adipate or dihydroxybutylene adipate. The polyesterether glycol such as hydroxypolyester or polydiethylene adipate of lactone series or lactone copolymer series may be used.

The hydrocarbon polyol is a polydiene having terminal hydroxyl groups selected from the class consisting of homopolymers and copolymers of conjugated dienes having 4 to 6 carbon atoms such as polybutadiene polyols, polyisoprene polyols, polychloroprene polyols, polypiperylene polyols, butadiene-isoprene copolymer polyols, and the like, copolymers of a conjugated diene and an aromatic vinyl monomer such as copolymer polyols of butadiene-styrene, isoprene-styrene, butadiene-vinyl naphthalene, butadiene-$\alpha$-methylstyrene, and the like, and copolymers of said conjugated diene and a vinyl nitrile monomer such as copolymer polyols of butadiene-acrylonitrile, isoprene-acrylonitrile, butadiene-α or β-methyl acrylonitrile, and the like, and is preferably polybutadiene glycol, butadiene-styrene copolymer glycol, or butadiene-acrylonitrile copolymer glycol.

Among them, polyether polyol such as polyoxyethylene glycol, polyoxypropylene glycol and polyoxytetramethylene glycol and polyester polyol such as polyethylene adipate are preferable. The number average molecular weight of said hydroxyl-containing compound is 400 to 5000 and preferably 600 – 2000.

Polyisocyanate to be used in the present invention is generally a compound having at least two isocyanate groups.

Typical examples of organic polyisocyanate are aromatic polyisocyanates such as tolylene-2,4- and 2,6-diisocyanate 4,4'-diphenyl methane diisocyanate, and ortho-tolidine diisocyanate, alicyclic polyisocyanates such as hydrogenated tolylene-2,4 and 2,6-diisocyanate, xylylene diisocyanate, hydrogenated xylylene diisocyanate and hydrogenated 4,4'-diphenyl methane diisocyanate, aliphatic polyisocyanates such as hexamethylene-1,6-diisocyanate, and mixtures thereof.

Among them, tolylene-2,4 and 2,6-diisocyanate, 4,4'-diphenyl methane diisocyanate, xylylene diisocyanate, hydrogenated 4,4'-diphenyl methane diisocyanate, hexamethylene-1,6-diisocyanate and mixtures thereof are preferable.

The equivalent weight ratio of the isocyanate group of the polyisocyanate to the hydroxyl group of the hydroxyl containing compound is preferable more 1.0.

3,9-Bis(2-hydrazidoethyl)-2,4,8,10-tetraoxaspiro-[5,5]-undecane to be used as a chain extender in the present invention may be prepared as follows.

The mixture of 1.0 mole of 3,9-bis(2-carbomethoxyethyl)-2,4,8,10-tetraoxaspiro-[5,5]-undecane and 2.0 moles of hydrazine hydrate are warmed in methanol for about 5 hours under reflux.

Thereafter, unreacted hydrazine hydrate and methanol are removed under reduced pressure by means of a rotary evaporator and the product is dried under vacuum to obtain white crystalline solid in high yield.

The product may further be purified by recrystallization using purified methanol.

In the present invention, it is desirable to use the recrystallized product as a chain extender, but the crude product may, of course, be applicable.

The product is analysed by elemental analysis to be 3,9-bis(2-hydrazidoethyl)-2,4,8,10-tetraoxaspiro-[5,5]-undecane. (Found C; 46.75%, H; 7.36%, N; 16.77%, Calculated C; 46.99%, H; 7.23%, N; 16.87%)

The amount to be used of said chain extender to said prepolymer is within the range of 0.8 – 1.3, more preferably 1.0 – 1.1, as equivalent ratio of the active hydrogen of said chain extender to the isocyanate group of said prepolymer.

The reaction temperature at which the chain extender is reacted with the prepolymer to prepare polyurethane is usually selected in the range of 10° – 50°C, preferably 20° – 30°C.

The prepolymer having terminal isocyanate groups according to the present invention may be produced by reacting a hydroxyl-containing compound having a number average molecular weight ranging from 400 to 5000 such as a polyhydroxyl compound, preferably dehydrated sufficiently by heating under reduced pressure, with an excess of an organic polyisocyanate such as, for example, organic diisocyanate, usually at 80° – 120°C.

The resulting prepolymer may be dissolved in a solvent to obtain a prepolymer solution. The solvent is preferably aprotic polar solvent alone such as dimethylformamide, dimethylacetamide, dimethylsulfoxide, N-methyl-2-pyrrolidone, hexamethylphosphortriamide and the like, or a mixture of the aprotic solvent with an aromatic solvent such as benzene, toluene, xylene, ethylbenzene and the like, an ester solvent such as methyl acetate, ethyl acetate, butyl acetate and the like, a ketone solvent such as acetone, methyl ethyl ketone, methyl isobutyl ketone and the like, a chlorinated hydrocarbon solvent such as trichlene, dichloromethane, dichloroethane and the like, or an ether solvent such as tetrahydrofuran, dibutyl ether and the like.

To the prepolymer solution may be gradually added a homogeneous solution of 3,9-bis(2-hydrazidoethyl)-2,4,8,10-tetraoxaspiro-[5,5]-undecane in one of the above mentioned aprotic polar solvents at room temperature or below to produce a homogeneous solution of polyurethane.

According to the present invention, the 3,9-bis(2-hydrazidoethyl)-2,4,8,10-tetraoxaspiro-[5,5]-undecane can be easily dissolved in a solvent for polyurethane elastomer or a solvent containing the organic polyisocyanate such as diisocyanate, at room temperature or a temperature lower than 50°C. Therefore, it is not necessary to heat a solvent or organic polyisocyanate such as diisocyanate, to as high as 140°C or higher.

As the result of easy preparation of polyurethane elastomers by using said chain extender according to the present invention, the application field of the polyurethane elastomer is diversified.

The chain extender used in the present invention is very effective in preparing polyurethane of excellent properties and has many advantages as described below compared with diamines or diols.

The chain extender to be used in the present invention is capable of being more easily handled than diamines because of its less poisonous property.

The reaction rate of the chain extender with prepolymer is moderate and the pot life of the polyurethane is satisfactorily long, so that the gel formation due to side reaction and discoloration of the resulting product does not occur.

The chain extention reaction proceeds selectively and a high molecular weight product can be easily obtained.

The chain extender has a lower melting point and does not decompose in molten state in comparison with aliphatic or aromatic dicarboxylic acid dihydrazide. Accordingly, it can be used in molten state. Moreover, said compound is easily soluble in many kinds of solvents and it is possible to select a mild reaction condition.

These properties described above are not recognized from the other hydrazide compound.

The polyurethane elastomer obtained by using the chain extender has superior resistance to thermal aging, weather proofing and properties of non-discoloration and toughness for bending and flex cracking because the chain extender has a spiroacetal ring in its molecular structure.

The following examples are given for illustration of the present invention, but the scope of the invention is not to be limited thereby.

EXAMPLE 1

In a 300 ml. separable flask equipped with a stirring rod, nitrogen inlet, thermometer and dropping funnel, were placed 10.1 g. (0.01 equivalent) of Adiprene L-100 (trade mark, prepolymer having terminal isocyanate groups obtained by reacting polyoxy tetramethylene glycol with tolylene diisocyanate, made by Du Pont de Nemours Company; isocyanate content is 4.2%) and 170 ml. of dimethylacetanide, and stirred at room temperature under nitrogen atmosphere to obtain a homogeneous solution. Then, a solution of 1.66 g. (0.01 equivalent) of 3,9-bis(2-hydrazidoethyl)-2,4,8,10-tetraoxaspiro-[5,5]-undecane in 30 ml. of dimethylacetamide was added dropwise to the prepolymer solution by means of dropping funnel.

Dropping was completed after about 5 minutes to obtain a transparent and homogeneous solution having high viscosity.

The reaction was continued for two hours under successive stirring.

Then, the above solution was poured into a large amount of water-methanol mixture to stop the reaction and recover the resulting polymer.

The resulting polymer was dried for 48 hours at 30°C under vacuum to obtain an elastic material. (The conversion was 91.8%.)

The intrinsic viscosity measured in tetrahydrofuran at 25°C was 0.55.

A tough and transparent elastic film was prepared by pouring the 25% tetrahydrofuran solution of the resulting polymer on a metal plate, evaporating tetrahydrofuran from the film over 1 night at room temperature and drying at 60°C under vacuum.

Following the procedure as above except that methylene-bis-orthochloroaniline was used as a chain extender instead of 3,9-bis(2-hydrazidoethyl)-2,4,8,10-tetraoxaspiro-[5,5]-undecane, an elastomer was obtained. However, the elastomer obtained was colored yellowish-brown.

EXAMPLE 2

In a manner similar to that in Example 1 except that 10.37 g. (0.01 equivalent) of Colonate 4090 (trade mark, a prepolymer having terminal isocyanate groups obtained by reacting polyoxytetramethylene glycol with tolylenediisocyanate, made by Nippon Polyurethane Company; isocyanate content is 4.05%) was used instead of Adiprene L-100, a tough and transparent polyurethane elastomer was obtained in conversion of 90.6%.

The intrinsic viscosity in tetrahydrofuran at 25°C was 0.64. A film obtained according to the same film forming procedure as Example 1 was also colorless, transparent and tough.

EXAMPLE 3

Following the procedure of Example 1 except that 11.97 g. (0.01 equivalent) of Cyanoprene A-85 (trade mark, a prepolymer having terminal isocyanate groups obtained by reacting polyethylene adipate glycol with tolylenediisocyanate, made by American Cyanamide Company; isocyanate content: 3.51%) was used instead of Adiprene L-100, 6.22 g. of an elastic and somewhat rigid solid was obtained (the conversion was 45.6%).

The intrinsic viscosity in tetrahydrofuran at 25°C was 0.43. The elastic film prepared by the same method as described in Example 1 was transparent and tough.

We claim:

1. A method for preparing polyurethane which comprises reacting 3,9-bis(2-hydrazidoethyl)-2,4,8,10-tetraoxaspiro-[5,5]-undecane as a chain extender with a prepolymer having terminal isocyanate groups produced by reacting an organic polyisocyanate with hydroxyl-containing compound having a number average molecular weight ranging from 400 to 5000, the equivalent ratio of the active hydrogen of the chain extender to the isocyanate group of the prepolymer ranging from 0.8 to 1.3.

2. A method according to claim 1 in which the hydroxyl-containing compound is selected from a class of polyether polyols, polyester polyls and hydrocarbon polyols.

3. A method according to claim 2 in which the equivalent ratio of the active hydrogen of the chain extender to the isocyanate group of the prepolymer ranges from 1.0 to 1.1.

4. A method according to claim 1 in which the number average molecular weight of the hydroxyl-containing compound ranges from 600 to 2000.

5. A method according to claim 1 in which the organic polyisocyanate has at least two isocyanate groups.

6. A method according to claim 5 in which the organic polyisocyanate is a compound selected from a class of tolylene -2,4 and 2,6-diisocyanates, 4,4'-diphenyl methane diisocyanate, xylylene diisocyanate, hydrogenated 4,4'-diphenylmethane diisocyanate, hexamethylene-1,6-diisocyanate and the mixture thereof.

7. A method according to claim 6 in which the organic polyisocyanate is tolylene -2,4 and 2,6-diisocyanates.

8. A method according to claim 3 in which the equivalent ratio ranges from 1.0 to 1.1.

9. A method for preparing polyurethane which comprises reacting 3,9-bis(2-hydrazidoethyl)-2,4,8,10-tetraoxaspiro-[5,5]-undecane as a chain extender with a prepolymer having terminal isocyanate groups produced by reacting an organic polyisocyanate selected from a class of tolylene -2,4 and 2,6-diisocyanates, 4,4'-diphenyl methane diisocyanate, xylylene diisocyanate, hydrogenated 4,4'-diphenyl methane diisocyanate, hexamethylene-1,6-diisocyanate and the mixture thereof with a hydroxyl-containing compound having a number average molecular weight ranging from 400 to 5000 selected from a class of polyoxyethylene glycol, polyoxypropylene glycol, polyoxytetramethylene glycol and polyethylene adipate glycol, and the equivalent ratio of the active hydrogen of the chain extender to the isocyanate group of the prepolymer ranging from 0.80 to 1.30.

* * * * *